Figure 1:
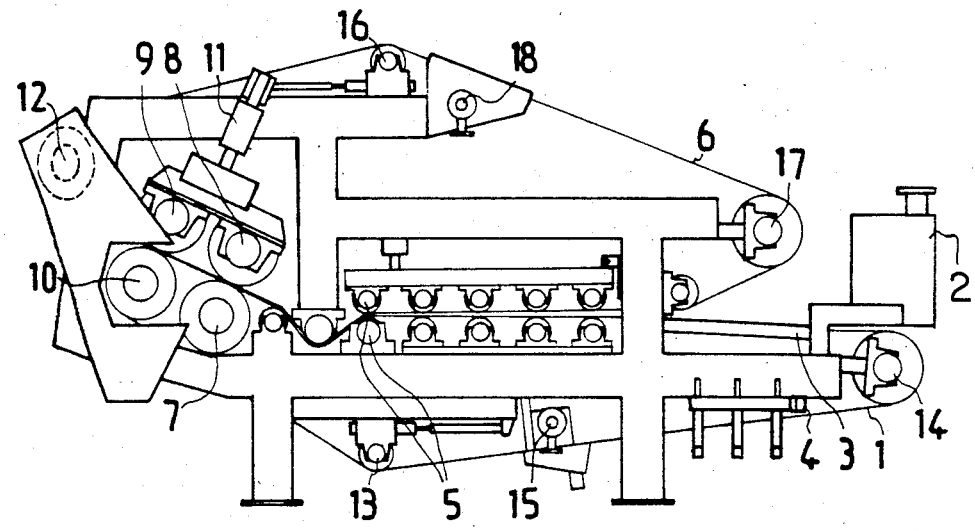

United States Patent [19]

Lintunen

[11] Patent Number: 4,604,195
[45] Date of Patent: Aug. 5, 1986

[54] FILTER PRESS FOR THICKENING CELLULOSE PULP OR SLUDGE

[75] Inventor: Tuomo Lintunen, Savonlinna, Finland

[73] Assignee: Enso-Gutzeit Oy, Helsinki, Finland

[21] Appl. No.: 603,136

[22] Filed: Apr. 23, 1984

[30] Foreign Application Priority Data

Apr. 22, 1983 [FI] Finland .................................. 831387

[51] Int. Cl.⁴ ............................................ B01D 33/04
[52] U.S. Cl. ..................................... 210/131; 100/120; 100/139; 162/336; 210/132; 210/297; 210/388; 210/393; 210/400; 210/411; 210/418
[58] Field of Search ............... 100/118, 119, 120, 137, 100/138, 139; 162/336, 337, 341; 210/130, 131, 132, 295, 297, 350, 359, 384, 388, 391, 393, 400, 401, 407, 409, 411, 418, 356, 405

[56] References Cited

U.S. PATENT DOCUMENTS 2,773,601 12/1956 Keller et al. .................... 210/130 X
3,215,593 11/1965 Green ............................ 162/336 X
4,136,035 1/1979 Bogomolov et al. ............... 210/388
4,491,521 1/1985 Wenske et al. ..................... 210/401

*Primary Examiner*—Richard V. Fisher
*Assistant Examiner*—W. Gary Jones
*Attorney, Agent, or Firm*—Toren, McGeady, Stanger, Goldberg & Kiel

[57] ABSTRACT

A filter press for the thickening of cellulose pulp or sludge in which the filter press is furnished with a feedbox to lead the sludge suspension to the wire. In order to increase the capacity of filter presses or the like, the sludge to be dried can be fed through a feedbox in accordance with the invention, in which box there is at least one surface penetrating the liquid to facilitate thickening of the sludge suspension before it is lead to the filter press wire.

9 Claims, 3 Drawing Figures

FILTER PRESS FOR THICKENING CELLULOSE PULP OR SLUDGE

The subject of this invention is a filter press for the thickening of cellulose pulp of sludge, the press being furnished with a feedbox to lead the sludge to the wire.

The main task of the filter press is to separate the liquid from the sludge web being handled. In practical circumstances the feed thickness of the sludge has a great influence on the capacity of the equipment and dry material content of the final product. Reduction of the feed thickness results in a corresponding reduction in the capacity of the equipment, or correspondingly the dry material content of the web decreases. If the feed to the wire can be accomplished with the greatest possible thickness, the equipment capacity and/or dry material content increase correspondingly.

The usual solution is to remove the liquid at the wire with gravitational force before the pressing stage. As the wire is not a very good filter the wire must be correspondingly extended so as to allow the liquid to drain away before the pressing stage begins.

It is common practice to use a rotating drum to pre-thicken the sludge, the drum being applied before the actual filter press. This kind of thickener is described in Finnish Patent Publication No. 56627 but such a separate prethickener requires, however, individual operational machinery and water jet pipework. The space it requires is also fairly large and the filtering efficiency cannot be easily controlled.

The intention of this invention is to increase the efficiency of the filter press by separation of the fluid out of the sludge suspension at the feeding stage by means of a thickening feedbox. Thus the fluid volume to be removed by the actual filter press is reduced and equipment capacity is raised without the large constructions that prethickening require.

It is an essential characteristic of the filter press according to the invention that there is at least one penetrating surface for thickening of the sludge suspension before it is led to the filter press wire. The specific water penetration capacity of the filter element in the feedbox is much higher than that of the wire because the hole size can be much larger than that of the wire.

It is characteristic to one advantageous mode of application of the invention that liquid can be removed with the aid of an internally fitted throat, at least part of its walls being made of water-penetrating screen or perforated sheet. This is a simple solution. Perforated sheets are readily available for various purposes and from these it is easy to construct the filter element required.

Furthermore it is characteristic to one mode of application of the invention that the feedbox throat is constructed entirely of the sheets and/or of the walls of the feedbox.

It is characteristic to one advantageous application of the invention that both sheets of the feedbox throat have a filtering function. In this case the filter element capacity is increased and it is also easier to clean and this can also in this case be performed while operating.

It is also characteristic to one advantageous mode of application of the invention that the sludge is pressure-fed into the feedpipe of the feedbox.

It is characteristic to an advantageous mode of application of the invention that the shape of the feedbox throat can be modified by moving one or more of the walls and/or turning them. This kind of construction offers a wide range of control options for treating different sludges and capacity to handle different loadings with the same filtering elements.

It is characteristic to one advantageous mode of application of the invention that at least one of the sides of the feedbox throat is furnished with overload protection so that a flank gives way in an overload state and the necessary quantity of sludge is let out to balance out the feed pressure.

It is further characteristic to one mode of application of the invention that the outflow of the filtered liquid from the feedbox outlet pipe can be regulated by means of a valve element. This solution also allows efficient and simple regulation equipment to be used to regulate filtering capacity. In addition there are circumstances in which it must be possible to shut off the outlet pipe completely, for example, during flushing.

It is additionally characteristic to one mode of application of the invention that the feedbox filter surfaces can be vibrated in order to increase the flow of the sludge. This also inhibits blockage of the filtering surfaces in difficult conditions.

It is further characteristic to one mode of application of the invention that the walls of the feedbox throat, at least in the neighbourhood of the outlet aperture are formed with a curvature. This assists an even formation of the web on the wire.

It is further characteristic to one mode of application of the invention that the feedbox throat can be flushed by leading in pressurised cleaning fluid from the branch of the feedbox outlet pipe.

The invention is described more accurately by means of the following examples. The influence of the liquid quantities and feed thicknesses to be processed can be gathered from the table below in which (Q) is the liquid quantity taken out by the filter press while the feed thickness (Sa) is varied and both capacity and dry material content are kept constant.

| Sa (%) | Q (l/min) |
| --- | --- |
| 0.5 | 9800 |
| 1.0 | 4800 |
| 2.0 | 2300 |
| 3.0 | 1500 |
| 4.0 | 1100 |
| 5.0 | 850 |

As long as the suspension in the feedbox can be thickened by 0.5% to 1.0% a reduction of the fluid quantity to be handled by a filter press of 5000 l/min can be attained.

Examples are clarified by reference to the accompanying drawings in which

FIG. 1 is a general view of the filter press with feedbox connected as seen from the side.

Figure 2:
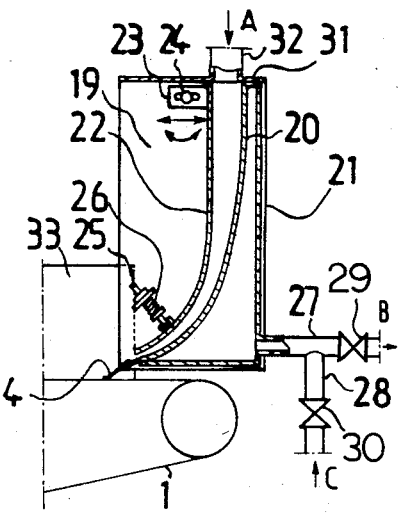

FIG. 2 presents one of the feedbox units in accordance with the invention, in section along the press centre-line.

Figure 3:
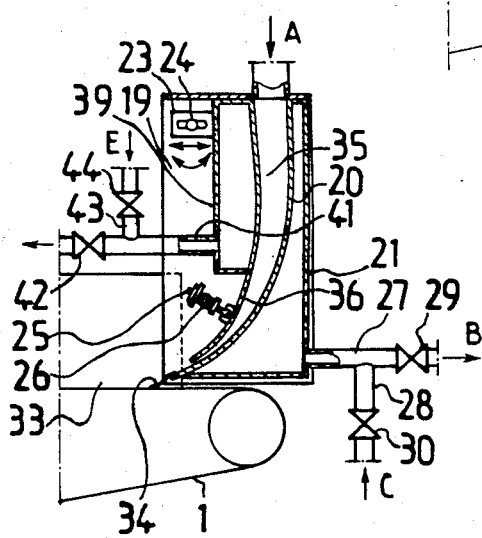

FIG. 3 presents a second feedbox unit in accordance with the invention, in section along the press centre-line.

In the filter press shown in FIG. 1 the processed suspension is fed to the filtercloth 1 of a wire unit through feedbox 2. The liquid separating to box 3, with the assistance of vacuum pressure or gravitational force is led out through pipe 4.

The material web running between filtercloth 1 and 6 forming the wire unit is carried through a wedge-shaped section formed by the rolls 5, during which the web dry material content rises while the liquid is extracted under the influence of the pressure of rollers 5. With the aid of rolls 7 and 8, the lower driven roll 10 and roll 9 a strong pressing effect is imposed on the track between filtercloth points 1 and 6, in order to further raise the dry material content. The pressing force is applied by the operational unit 11. Momental driving force is transmitted to the filter cloth 1 by driving roll 10 and to filtercloth 6 by the driving roll 12. The filtercloth 1 is controlled by roll 13 and tensioned by roll 14. Washing is carried out in box 15. The corresponding parts at filtercloth 6 are 16, 17, and 18.

In one mode of application according to the invention as seen in FIG. 2, the sheets 19 form the side walls of the feedbox, the sheet 20, perforated with small holes, penetrates through the liquid and is curved, being fastened between the side walls 19. The sheet 21 is formed below perforated sheet 20 and between walls 19 and these make up the fluid container. The feed throat is formed by perforated sheet 20 and curved sheet 22. To this, sheet 23 is fastened by which sheet 22 is fastened by screws 24 to the walls 19. There are long openings in sheet 23 which provide adjustment for the positioning of sheet 22. Sheet 22 may also at the same time be rotated around screw 24 and the rotation limited by screw 25. Screw 25 is positioned within the coil of spring 26 which is compressed should the pressure in the throat rise too high. Sheet 22 is sealed at its ends at 19. The outlet pipe 27 to the container formed by sheets 21 and 19 has a branch connection 28. Valves 29 and 30 are connected into both pipelines. The feedpipe 32 is fixed to the feedbox cover 31. To the side walls 19 side plates 33 are connected, the function of which is to prevent flow of the suspension in a sidewards direction. The seal 34 is a continuation of sheet 20 which rests on filtercloth.

The suspension to be treated in the feedbox is fed in through pipe 32 in the direction of arrow A. The suspension is carried along the throat formed by sheets 20, 22 and walls 19, with a relatively high speed and pressure, to the filter press 1, when liquid is separated out of the suspension through the holes in sheet 20. The liquid is outlet in the direction of arrow B. The outflow can be regulated by the valve 29. The throat shape can be modified by adjusting the attitude of sheet 22 to suit each sludge suspension. With the aid of pipe 28 and valve 30 the strainer surface can be washed with cleaning water in the direction of arrow C. The valve 29 is then kept closed.

In another mode of application of the invention the feedbox is as shown in FIG. 3. in which fluid is also separated through another throat surface. The perforated sheet 20 penetrating the liquid is as before fastened to the side walls 19, and is bent into a curved surface. The other half of the throat is now formed by the perforated sheet 35, and to that the full sheet 36 and the case 39, constituting a second fluid collection box. The curved part composed of the abovementioned sheets is fastened to the side walls 19 by means of the sheets 23 and joint 24 fastened to case 39. There is a long opening for fastening in sheet 23 which allows longitudinal adjustment. Sheets 35 and 36 are additionally seated to sidewalls 19.

The box forming case 39 has an individual outlet system, comprising outlet pipe 41 and its valve 42 and the branch 43 and its valve 44, intended for entry of the washing liquid (arrow E) In this case flushing of the strainer surfaces can be performed during operation, for example in alternation.

To persons expert in this field it is clear that the various modes of application of this invention are not only limited to the abovementioned examples but can be modified later within the framework of the Patent Claim herein presented.

We claim:

1. A filter press for thickening a material by removing liquid from the material, the press comprises a wire unit including a pair of oppositely disposed filtercloths in closely spaced relation and forming a passage therebetween having an inlet end and an outlet end for conducting a web of the material to be thickened through the press, and wall means for forming a feedbox for directing the material to be thickened into the inlet end of the wire unit, the feedbox comprises an elongated throat separate from said wire unit and arranged within said feedbox and having a feed direction for passing the material through the feedbox into the wire unit inlet end, said throat comprises a plurality of surfaces extending in the feed direction of the material and defining the cross-section of said throat transverse of the feed direction, at least one of said surfaces extending in the feed direction and between said wall means being perforate for removing liquid from the material passing through the throat and directing the liquid into the feedbox for thickening the material passing through the throat before it is passed into the inlet end of the wire unit of the filter press, said perforate surface having a water penetration capacity much higher than said filtercloths and at least one of said surfaces forming said throat being pivotally mounted in said feedbox for movement relative to the other surfaces of said throat for varying the size of the transverse cross-section of said throat.

2. A filter press according to claim 1, wherein said feedbox includes walls forming the periphery of said feedbox and said throat is formed in part by the walls of said feedbox and in part by sheets extending across the interior of said feedbox between said walls with said sheets being in spaced relation.

3. A filter press according to claim 2, wherein said throat is formed by a pair of said sheets and each of said sheets is perforate for providing a filtering function.

4. A filter press according to claim 1, wherein said feedbox includes inlet means for directing the material under pressure into said throat.

5. A filter press according to claim 1, wherein means are provided on one of said surfaces of said throat for affording an overload protection so that in an overload state said surface can be displaced for allowing the passage of the necessary quantity of material through the throat to balance out the feed pressure.

6. A filter press according to claim 1, wherein means are provided on the feedbox for regulating the flow of liquid from the feedbox, and said means includes valve elements for regulating the flow.

7. A filter press according to claim 1, wherein vibration means are provided on the surfaces of said feedbox for improving the drainage of liquid from the material.

8. A filter press according to claim 1, wherein said throat has an inlet and an outlet end with said outlet connected to the inlet to the wire unit, and at least certain surfaces of said throat are curved at the outlet.

9. A filter press according to claim 1, including means mounted on said feedbox for introducing pressurized cleaning liquid into said feedbox for flow into said throat for washing said throat.

* * * * *